(12) United States Patent
Foladare et al.

(10) Patent No.: US 6,311,210 B1
(45) Date of Patent: Oct. 30, 2001

(54) METHOD AND APPARATUS FOR SENDING AN ELECTRONIC MAIL MESSAGE TO A RECEIVING PARTY

(75) Inventors: Mark Jeffrey Foladare, Kendall Park; Shelley B. Goldman, East Brunswick, both of NJ (US); Hosagrahar Visvesvaraya Jagadish, Ann Arbor, MI (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/213,355

(22) Filed: Dec. 17, 1998

(51) Int. Cl.⁷ .................................................. G06F 13/00
(52) U.S. Cl. .......................... 709/206; 709/223; 709/313
(58) Field of Search .................................... 709/206, 219, 709/223, 224, 313

(56) References Cited

U.S. PATENT DOCUMENTS 5,740,230 * 4/1998 Vaudreuil ........................... 379/88.22
5,742,668 * 4/1998 Pepe et al. ........................... 455/415
6,023,700 * 2/2000 Owens et al. ........................... 707/10

* cited by examiner

*Primary Examiner*—Viet D. Vu.
(74) *Attorney, Agent, or Firm*—Oliff & Berridge, PLC

(57) ABSTRACT

The present invention provides a centralized electronic mail apparatus and method in which a message is sent to each of a subscriber's electronic mail receiving devices. When a sending party wishes to send an electronic mail message to a receiving party, the sending party creates the electronic mail message along with any attachments using his/her user device and sends the electronic mail message to the centralized electronic mail apparatus. The centralized electronic mail apparatus receives the electronic mail message and retrieves profile information from a profile database corresponding to the receiving party. Based on the profile information, the centralized electronic mail device further determines the receiving party's electronic mail receiving devices to which the electronic mail message is to be sent. The centralized electronic mail apparatus further determines the portions of the electronic mail message that are to be sent to each of the electronic mail receiving devices. The centralized electronic mail apparatus then sends the portions of the electronic mail message to the electronic mail receiving devices and monitors them to determine if the receiving party has retrieved the electronic mail message from any of the electronic mail receiving devices. If the receiving party retrieves the electronic mail message from any of the electronic mail receiving devices, a delete command is sent to at least a portion of the other electronic mail receiving devices based on the profile information retrieved.

27 Claims, 4 Drawing Sheets

| RECEIVING PARTY ID | ACCESS ADDRESS | RECEIVE MESSAGES | DELETE MESSAGES | PORTIONS |
|---|---|---|---|---|
| 555 - 554 - 1234 | 516 - 518 - 5523 | * | * | 10K |
| | THOMAS @ GSL.COM | * | * | ALL |
| | THOMAS @ ATT.COM | * | | ALL |
| | 516 - 949 - 5151 | * | * | 20K |
| SMITH, JOHN P. | 545 - 919 - 8763 | * | * | 20K |
| | SMITH @ ATT.COM | * | * | ALL |
| | 519 - 915 - 8181 | * | * | 10K |
| SMITH @ PBX.GOV | 763 - 452 - 9180 | * | * | 20K |

FIG. 3

METHOD AND APPARATUS FOR SENDING AN ELECTRONIC MAIL MESSAGE TO A RECEIVING PARTY

INCORPORATION BY REFERENCE

This application contains similar subject matter to co-pending and similarly assigned U.S. patent application Ser. No. 09/156,169 entitled "Centralized Message Service Apparatus and Method," filed on Sep. 17, 1998, which is hereby incorporated by reference.

BACKGROUND OF THE INVENTION

1. Field of Invention

The present invention is directed to a method and apparatus for providing a centralized electronic mail service for a subscriber.

2. Description of Related Art

Electronic mail (e-mail) is increasingly being used to send messages to people both locally and across the world. In addition, an increasing number of devices, such as conventional computers, alpha pagers, personal digital assistants (PDAs), and the like, may receive alphanumeric messages. When an electronic mail message is sent, the sending party may not know which of the many possible device destinations to select, what are the capabilities of each device, etc. Thus, new technology is needed to assist sending electronic mail.

SUMMARY OF THE INVENTION

The present invention provides a centralized electronic mail service method and apparatus in which selected portions of an electronic mail message is sent to each of a subscriber's electronic mail addresses.

When a sending party wishes to send an electronic mail message to a receiving party, the sending party creates the electronic mail message along with any attachments using his/her user device and sends the electronic mail message to the centralized electronic mail apparatus. The centralized electronic mail apparatus receives the electronic mail message and retrieves profile information from a profile database corresponding to the receiving party. Based on the profile information, the centralized electronic mail device further determines the receiving party's electronic mail receiving devices to which the electronic mail message is to be sent. The centralized electronic mail apparatus further determines the portions of the electronic mail message that are to be sent to each of the electronic mail receiving devices.

The centralized electronic mail apparatus then sends the portions of the electronic mail message to the electronic mail receiving devices and monitors them to determine if the receiving party has retrieved the electronic mail message from any of the electronic mail receiving devices. If the receiving party retrieves the electronic mail message from any of the electronic mail receiving devices, a delete command may be sent to selected ones of the other electronic mail receiving devices based on the profile information retrieved.

BRIEF DESCRIPTION OF THE DRAWINGS

The preferred embodiments of the present invention will be described with reference to the following figures, wherein like numerals designate like elements, and wherein:

FIG. 3 is an exemplary diagram of a data structure of the database of FIG. 1.

DETAILED DESCRIPTION OF PREFERRED EMBODIMENTS

Figure 1:
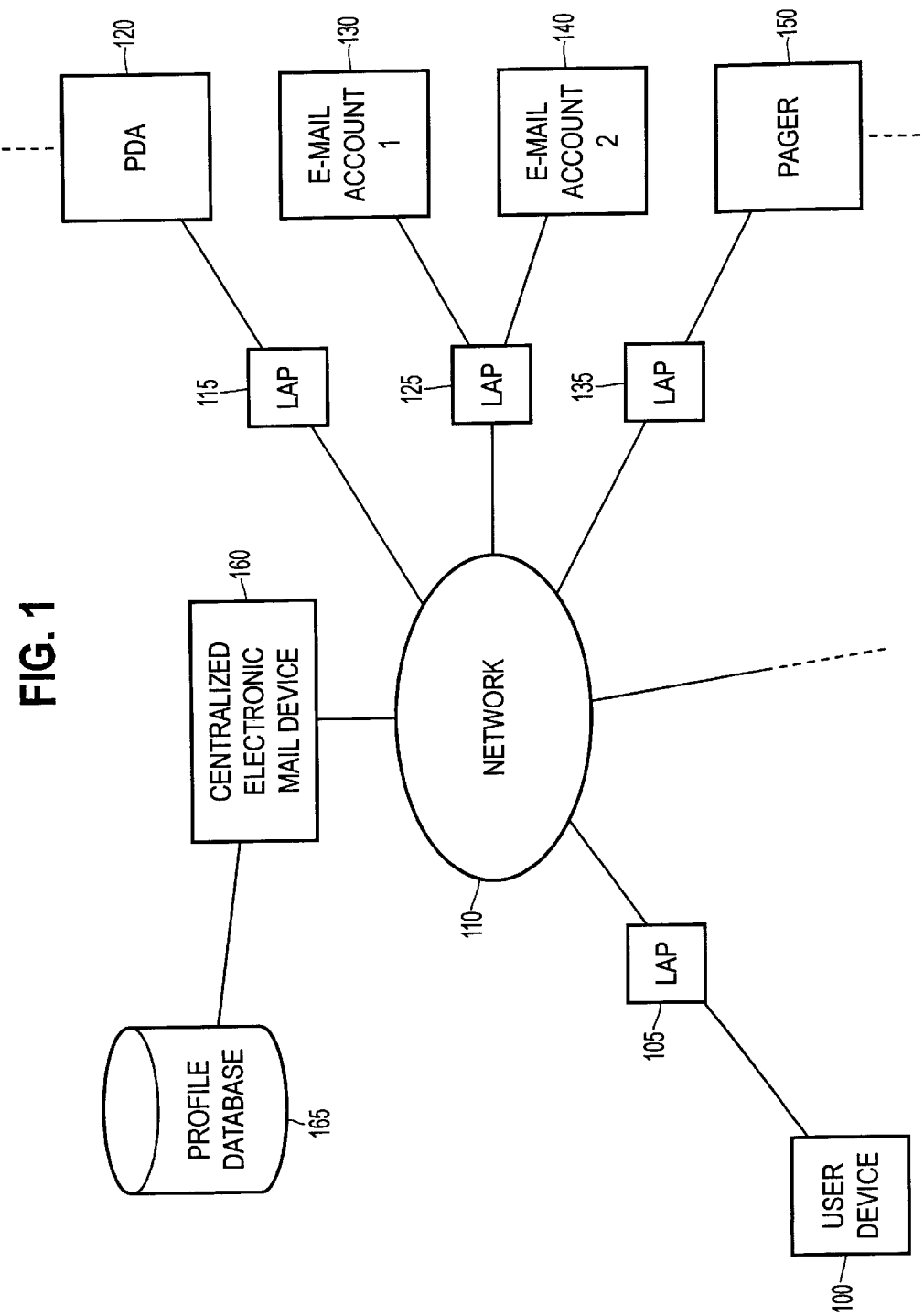
FIG. 1 is a block diagram of a centralized electronic mail messaging system.

FIG. 1 is a block diagram of a centralized electronic mail messaging system. The system may include a user device 100, local access providers (LAPs) 105, 115, 125 and 135, a network 110, electronic mail receiving devices 120, 130, 140 and 150, a centralized electronic mail device 160 and a database 165. The user device 100 and the electronic mail receiving devices 120, 130, 140 and 150 are in communication with the network 110 through the LAPs 105, 115, 125 and 135, respectively. The centralized electronic mail device 160 is also in communication network 115 and has access to a profile database 165.

The user device 100 may be any device that provides an interface through which a user may enter and send an electronic mail message. For example, the user device 100 may be a computer, a personal digital assistant (PDA), a WebTV™ device, an intelligent or computer assisted televisions, a two-way pager, and the like. The user device 100 may also be a telephone or other voice input device that allows a user to speak the electronic mail message which is then translated into a textual electronic mail message as will be described with regard to the second embodiment of the present invention.

The user device 100 is in communication with the network 110 over communications links. These communications links may be any type of connection that allows the transmission of communication signals and/or data. Some examples include conventional telephone lines, fiber optic lines, direct serial connection, coaxial cable, wireless communication links and the like.

The network 110 may be a single network or a plurality of networks. For example, the network 110 may include a local telephone network (such as a Bell Atlantic telephone network), a long distance network (such as an AT&T long distance telephone network) or a company's proprietary intranet. Thus, the types of networks that may be used include communications networks, cable TV networks, the Internet, private intranets, cellular communication networks, a local area network (LAN), a wide area network (WAN) and the like. The network 110 may also be any combination of these types of networks.

The centralized electronic mail device 160 may be a single processor or may be a distributed processing system incorporated into the network 110. The centralized electronic mail device 160 may further be in connection with a plurality of different network types at the same time. For example, the centralized electronic mail device 160 may be in connection with both a data network and a telephone communications network and process communications over both networks.

The local access providers (LAPs) 105, 115, 125 and 135 may be any type of device that provides an interface between the user device 100 or the electronic mail receiving devices 120, 130, 140 and 150, and the network 110. For example, the LAPs 105, 115, 125 and 135 may be an Internet Service Provider (ISP), a local exchange carrier (LEC), and the like.

The electronic mail receiving devices 120, 130, 140 and 150 may be any type of device that is capable of receiving electronic mail messages. For example, the electronic mail receiving devices 120, 130, 140 and 150 may include computers, personal digital assistants (PDAs), alphanumeric pagers, two-way pagers, and the like.

When a sending party wishes to send an electronic mail message to a receiving party, the sending party, via the user device 100, for example, may enter the electronic mail message and an electronic mail address of the receiving party in the centralized electronic mail device 160. The electronic mail message contains fields of information pertaining, for example, to the name of the sending party, the name of the receiving party, the title of the message, the distribution list of the message, date and time of sending, body of the text message, attachments, and the like.

The centralized electronic mail device 160 receives the electronic mail message from the user device 100 and stores the electronic mail message in association with the receiving party's centralized electronic mail device 160 electronic mail address. The centralized electronic mail device 160 then retrieves information from the profile database 165 corresponding to the centralized electronic mail device 160 electronic mail address of the receiving party. The information retrieved includes, for example, the electronic mail addresses for the receiving party's electronic mail receiving devices 120–150, an identifier that identifies which electronic mail receiving devices 120–150 are to receive the electronic mail message, an identifier to identify the electronic mail receiving devices 120–150 that are to automatically delete the electronic mail message once it is received by at least one of the electronic mail receiving devices 120–150, and the amount of electronic mail message data that the electronic mail receiving device 120–150 is able to receive and display and the portions, i.e. the fields of the electronic mail message that are to be sent to the electronic mail receiving device 120–150.

Based on the information retrieved from the profile database 165, the centralized electronic mail device 160 sends portions of the electronic mail message stored in memory to the designated electronic mail receiving devices 120–150. The portions of the electronic mail message sent to the electronic mail receiving devices 120–150 depends on the portions identified in the profile information retrieved and the amount of data that the device is able to receive and display. For example, if one of the electronic mail receiving devices 120–150 is an alpha pager, because of the limited display size, the portions of the electronic mail message that are sent to the alpha pager may be limited to the sending party name, title of the message, and time and date of sending. On the other hand, if one of the electronic mail receiving devices 120–150 is a personal digital assistant (PDA) or personal computer, for example, the entire electronic mail message may be sent to the PDA or personal computer.

Upon sending the electronic mail message to the electronic mail receiving devices 120–150 identified in the profile information, the centralized electronic mail device 160 monitors the electronic mail receiving devices 120–150 to determine if the receiving party has accessed the message. If the receiving party accesses the electronic mail message on any of the electronic mail receiving devices 120–150, the electronic mail message is then deleted from the other electronic mail receiving devices 120–150 identified as being flagged for deletion in the profile information retrieved from the profile database 165.

The monitoring may be performed by sending query messages to the electronic mail receiving devices 120–150 or may be performed by awaiting respective signals from the electronic mail receiving devices 120–150 indicating that the receiving party has accessed the message. The query message may, for example, take the form of a message requesting that the electronic mail receiving device 120–150 indicate whether the receiving party has deleted the message from the electronic mail receiving device 120–150. Alternatively, the electronic mail receiving devices 120–150 may be adapted to send a signal to the centralized electronic mail device 160 when the electronic mail message has been deleted from the electronic mail receiving device 120–150. Other methods of determining whether the electronic mail message has been accessed are readily known to those of ordinary skill in the art and may be used without departing from the spirit and scope of the present invention.

Figure 2:
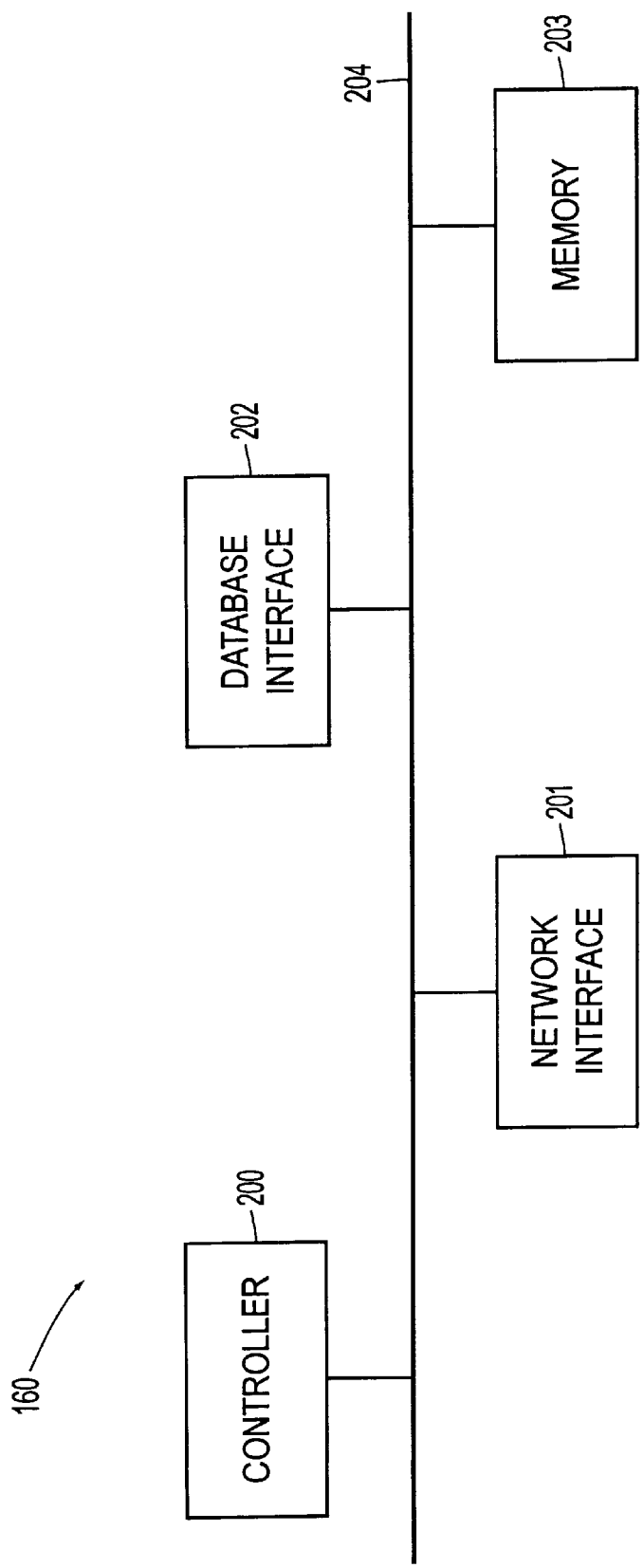
FIG. 2 is a block diagram of the centralized electronic mail device of FIG. 1.

FIG. 2 is a block diagram of the centralized electronic mail device 160 of FIG. 1. The centralized electronic mail device 160 includes a controller 200, a network interface 201, a database interface 202 and a memory 203. The controller 200 communicates with network 110 through network interface 201 and database 165 through database interface 202. The memory 203 contains control programs for controlling the operation of the centralized electronic mail device 160 and provides a storage for electronic mail message data and profile information retrieved from the profile database 165. The controller 200, network interface 201, database interface 202 and memory 203 are in communication with one another over bus 204.

The network interface 201 may include a plurality of interfaces that facilitate communication with the different types of networks with which communication is made. For example, the network interface 201 may include an interface to a data network and another interface to a conventional voice telecommunications network.

The controller 200 receives electronic mail messages from a sending party's user device 100 through network 110 and network interface 201, for example. When the electronic mail message is received by the network interface 201, the controller 200 causes the electronic mail message to be stored in memory 203 in association with the receiving party's electronic mail address. The controller 200 then retrieves information from the profile database 165 corresponding to the electronic mail address of the receiving party, through database interface 202.

Based on the information retrieved from the profile database 165, the controller 200 sends portions of the electronic mail message stored in memory 203 to the designated electronic mail receiving devices 120–150 through network interface 201. Upon sending the electronic mail message to the electronic mail receiving devices 120–150 identified in the profile information retrieved, the controller 200 monitors the electronic mail receiving devices 120–150 to determine if the receiving party has accessed the message. If the receiving party accesses the electronic mail message on any of the electronic mail receiving devices 120–150, the controller 200 causes the electronic mail message to be deleted from the other electronic mail receiving devices 120–150 identified as being flagged for deletion in the profile information retrieved from the profile database 165.

Alternatively, the above monitoring and message handling functions may be performed by separate devices under the control of the controller 200. For example, there may be a separate device for determining the portions of the electronic mail message to be sent for each of the receiving party's electronic mail receiving devices 120–150 and to compile these portions into a message to be sent to the electronic mail receiving devices 120–150. Likewise, a separate device may be used to monitor the electronic mail receiving devices 120–150 to determine if the message has been received by the receiving party on any of these electronic mail receiving devices 120–150. Thus, the functions of the controller 200 described above may be separated and performed by different devices incorporated into the centralized electronic mail device 160.

FIG. 3 is an exemplary data structure of the profile database 165. As shown in FIG. 3, the data structure contains a field 301 for a receiving party identifier, a field 302 for the access addresses of the electronic mail receiving devices 120–150 of the receiving party, a field 303 for identifying the electronic mail receiving devices 120–150 that are to receive the electronic mail message, a field 304 for identifying the electronic mail receiving devices 120–150 from which the electronic mail messaging is to be deleted when the electronic mail message is accessed by the receiving party, and a field 305 for designating the portions of the electronic mail message that are to be sent to the electronic mail receiving devices 120–150. The asterisk "*" in fields 303 and 304 designates those electronic mail receiving devices 120–150 that should receive the electronic mail message and those that should receive a delete signal when the electronic mail message is accessed by the receiving party.

When the controller 200 retrieves the profile information for the receiving party from the profile database 165 based on a search of field 301, the controller 200 may temporarily store the retrieved profile information in the memory 203. The controller 200 then determines from the retrieved information, the electronic mail receiving devices 120–150 that are to receive the message (obtained from field 303), the access address of these electronic mail receiving devices 120–150 (obtained from field 302) and the portions of the electronic mail message that are to be sent to the electronic mail receiving devices 120–150 (obtained from field 305). When the controller 200 determines that the electronic mail message has been accessed by the receiving party, the controller 200 identifies to which electronic mail receiving devices 120–150 deletion signals are to be sent using field 304.

Figure 4:
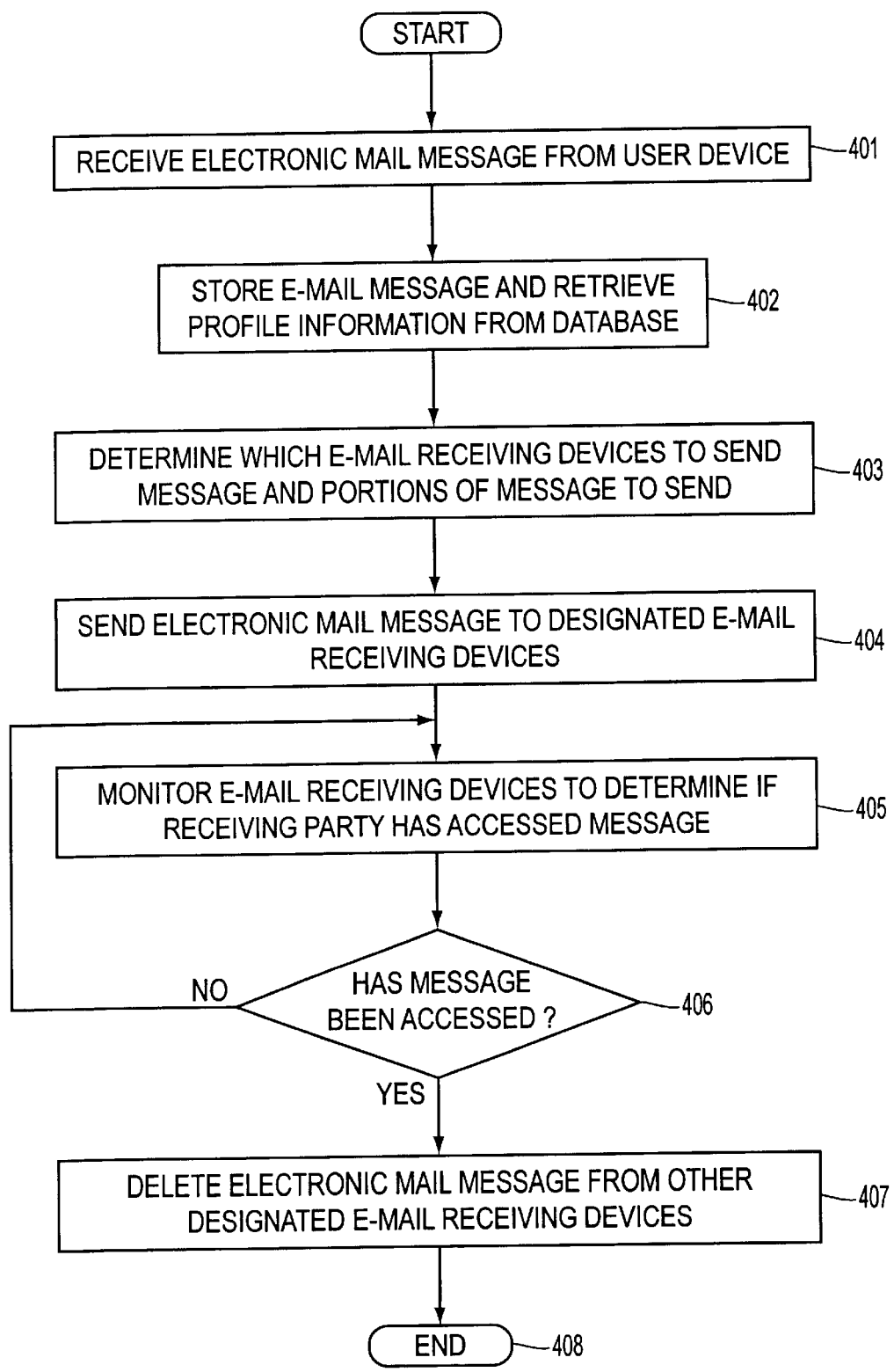
FIG. 4 is a flowchart of an exemplary process of the centralized electronic mail device.

FIG. 4 shows a flowchart of the operation of the centralized electronic mail device 160 of FIG. 2. In step 401, the controller 200 receives an electronic mail message from the user device 100 and goes to step 402. In step 402, the controller 200 stores the electronic mail message in memory 203 and retrieves profile information from the profile database 165 corresponding to the receiving party identifier of the receiving party and goes to step 403.

In step 403, the controller 200 determines which electronic mail receiving devices 120–150 are to receive the electronic mail message, based on the profile information retrieved. The controller 200 also determines the portions of the electronic mail message to send to each of the electronic mail receiving devices 120–150, and goes to step 404. In step 404, the controller 200 sends these portions of the electronic mail message to the electronic mail receiving devices and goes to step 405.

In step 405, the controller 200, or a dedicated monitoring device, monitors the electronic mail receiving devices 120–150 to which the electronic mail message was sent, to determine if the receiving party has accessed the electronic mail message from any of the electronic mail receiving devices 120–150, and goes to step 406. In step 406, if the electronic mail message has been accessed, the controller 200 goes to step 407; otherwise the controller 200 returns to step 405 and continues to monitor the electronic mail receiving devices 120–150. In step 407, the controller 200 sends delete signals to the other electronic mail receiving devices 120–150 that received the electronic mail message instructing them to delete the electronic mail message, goes to step 408 and ends the process.

Using the above centralized electronic mail device 160, a receiving party may receive portions of an electronic mail message even when the electronic mail receiving device has a limited storage or limited display size. In this way, only those portions of the electronic mail message, which the receiving party deems the most important by identifying them in the profile database 165, are sent to the electronic mail receiving device 120–150. Thus, other information in the electronic mail message that the receiving party does not wish to see is not displayed.

In addition to determining the portions of the electronic mail message to send to the various electronic mail receiving devices 120–150, the centralized electronic mail device 160 of the present invention may also determine which devices are to receive any attachments to the electronic mail message. Attachments are files, such as bitmap files, document files, programs, and the like, that are attached to the electronic mail message and are to be forwarded to the receiving party along with the electronic mail message. These files may be quite large and it may not be desirable to have them sent to all of the receiving party's electronic mail receiving devices 120–150. For example, an alpha pager is not capable of displaying a bitmap file or executing programs. Thus, it would be wasteful to send these attachment files to the alpha pager even if they are able to be received by the alpha pager. Thus, the centralized electronic mail device 160 of the present invention may include in the determination of the portions of the electronic mail message to send to the electronic mail receiving devices 120–150, a determination of whether or not to send attachments, which types of attachments to send, and the like. The determination of which type of attachments to send may be based on file extensions such as .doc, .txt, .exe, .bmp, and the like.

Next, a real-life example of the use of the present invention will be described. Suppose a sending party, Candace, wishes to send an electronic mail message to Steve using the present invention. Candace composes the electronic mail message using her user device 100, for example, and sends the message to the centralized electronic mail device 160 using Steve's electronic mail address corresponding to the centralized electronic mail device 160. When the centralized electronic mail device 160 receives the electronic mail message, it is stored in memory and profile information from the profile database 165 is retrieved. Based on the information retrieved from the profile database 165, the centralized electronic mail device 160 sends appropriate portions of the electronic mail message to the electronic mail receiving devices 120–150. Steve then retrieves the electronic mail message, or portions thereof, using at least one of the electronic mail receiving devices 120–150. Once it is determined that Steve has received the electronic mail message, the centralized electronic mail device 160 sends a delete command to the other of the electronic mail receiving devices 120–150 which are flagged for deletion in the profile information retrieved from the profile database 165.

In this way, Steve may receive portions of the electronic mail message using his pager 150 and receive the entire electronic mail message at a later time using his e-mail account 130 (which is not flagged for deletion). Thus, Steve may be made aware of urgent electronic mail messages using his pager and then access the entire message using an electronic mail receiving device that is capable of receiving and displaying the entire electronic mail message.

While the above embodiments are described in terms of the electronic mail messages being sent to the electronic mail receiving devices 120–150 when the electronic mail message is received by the centralized electronic mail device 160, the present invention is not limited to such. The electronic mail messages may be forwarded to the electronic mail received devices 120–150 on demand. In other words, the electronic mail messages may be stored in the centralized electronic mail device 160 until one of the receiving devices 120–150 accesses the centralized electronic mail device 160 and requests sending of the electronic mail messages. Upon receiving the request, the centralized electronic mail device 160 performs its functions in a manner similar to that described above and the electronic mail message, or portions thereof, is sent to the electronic mail message receiving device 120–150 that requested the sending of the electronic mail message.

Additionally, while the above embodiments include LAPs 105, 115, 125 and 135, these devices are not necessary to the functioning of the invention. Rather, the user device 100 and electronic mail receiving devices 120–150 may be directly linked to the network 110. For example, if the network 110 is a local area network, LAPs may not be provided. Thus, a simplification of the invention, as is readily apparent to one of ordinary skill in the art, is effectuated.

As shown in FIG. 2, the method of this invention is preferably implemented on a programmed processor. However, the centralized electronic mail device 160 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. For example, the monitoring may be performed by a special ASIC while other functions are performed by a general purpose computer. In general, any device on which a finite state machine capable of implementing the flowchart shown in FIG. 4 can be used to implement the centralized electronic mail device 160 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of sending an electronic mail message to a receiving party, comprising:

receiving the electronic mail message from a sending device;

selecting portions of the electronic mail message to send to selected ones of a plurality of electronic mail receiving devices, wherein the portions of the electronic mail message are selected for a selected electronic mail receiving device based on at least one of user preference information and capabilities of the selected electronic mail receiving device;

sending the portions of the electronic mail message to corresponding ones of the electronic mail receiving devices;

determining if the portions of the electronic mail message have been retrieved from a corresponding selected electronic mail receiving device;

determining which ones of the plurality of electronic mail receiving devices are to receive an electronic mail message delete signal; and sending an electronic mail message delete signal to the ones of the plurality of electronic mail receiving devices that are to receive the electronic mail message delete signal.

2. A method of sending an electronic mail message to a receiving party, comprising:

receiving the electronic mail message from a sending device;

selecting portions of the electronic mail message to send to selected ones of a plurality of electronic mail receiving devices, wherein the portions of the electronic mail message are selected for a selected electronic mail receiving device based on at least one of user preference information and capabilities of the selected electronic mail receiving device;

sending the portions of the electronic mail message to corresponding ones of the electronic mail receiving devices;

monitoring whether respective portions of the electronic mail message has been retrieved from a corresponding electronic mail receiving device; and deleting portions of the electronic mail message from selected ones of the other electronic mail receiving devices if the respective portions of the electronic mail message has been retrieved from a corresponding electronic mail receiving device.

3. The method of claim 2, further comprising deleting portions of the electronic mail message from each of the plurality of electronic mail receiving devices that received at least one portion of the electronic mail message based on information retrieved from a profile database.

4. The method of claim 2, wherein the step of monitoring comprises sending a query signal to each of the selected ones of the plurality of electronic mail receiving devices and determining if a response is received from at least one of the selected ones of the plurality of electronic mail receiving devices indicating that the respective portion of the electronic mail message has been retrieved by the receiving party.

5. The method of claim 2, wherein the step of monitoring comprises receiving a signal from a selected one of the plurality of electronic mail receiving devices to which at least one portion of the electronic mail message was sent indicating that the respective portion of the electronic mail message has been retrieved.

6. A method of sending an electronic mail message to a receiving party, comprising:

receiving the electronic mail message from a sending device;

selecting portions of the electronic mail message to send to selected ones of a plurality of electronic mail receiving devices, wherein the portions of the electronic mail message are selected for a selected electronic mail receiving device based on at least one of user preference information and capabilities of the selected electronic mail receiving device, and the step of selecting portions of the electronic mail message further comprises retrieving profile information from a profile database based on a central electronic mail address of the receiving party; and sending the portions of the electronic mail message to corresponding ones of the electronic mail receiving devices, wherein the profile information includes at least one of a field for identifying the ones of the plurality of electronic mail receiving devices that are to receive the electronic mail messages, a field for identifying the access address of the ones of the electronic mail receiving devices that are to receive the electronic mail message, a field to identify the portions of the electronic mail message that are to be sent to the ones of the electronic mail receiving devices that are to receive the electronic mail message, and a field to identify which of the ones of the electronic mail receiving devices that are to receive a deletion signal once the electronic mail message is retrieved by a receiving party from at least one of the plurality of electronic mail receiving devices.

7. An electronic mail message sending apparatus that sends electronic mail messages to a receiving party, comprising:

a controller; and a profile database, wherein the controller receives the electronic mail message from a sending device, selects at least one portion of the electronic mail message to send to selected ones of the plurality of electronic mail receiving devices, and sends the at least one portion of the electronic mail message to corresponding ones of the electronic mail receiving devices, wherein the at least one portion of the electronic mail message is selected for a selected electronic mail receiving device based on information of the capabilities of the selected electronic mail receiving device stored in the profile database.

8. The apparatus of claim 7, wherein the at least one portion of the electronic mail message includes at least one of the name of the sending party, the name of the receiving party, the title of the electronic mail message, the distribution list of the message, date and time of sending, body of the text message and attachments.

9. An electronic mail message sending apparatus that sends electronic mail messages to a receiving party, comprising:

a controller; and a profile database, wherein the controller receives the electronic mail message from a sending device, selects portions of the electronic mail message to send to selected ones of the plurality of electronic mail receiving devices, and sends the portions of the electronic mail message to corresponding ones of the electronic mail receiving devices, wherein the portions of the electronic mail message are selected for a selected electronic mail receiving device based on at least one of user preference information and information of the capabilities of the selected electronic mail receiving device stored in the profile database, wherein the controller determines if the portions of the electronic mail message have been retrieved from a corresponding selected electronic mail receiving device, determines which ones of the plurality of electronic mail receiving devices are to receive an electronic mail message delete signal, and sends an electronic mail message delete signal to the ones of the plurality of electronic mail receiving devices that are to receive the electronic mail message delete signal.

10. An electronic mail message sending apparatus that sends electronic mail messages to a receiving party, comprising:

a controller; and a profile database, wherein the controller receives the electronic mail message from a sending device, selects portions of the electronic mail message to send to selected ones of the plurality of electronic mail receiving devices, and sends the portions of the electronic mail message to corresponding ones of the electronic mail receiving devices, wherein the portions of the electronic mail message are selected for a selected electronic mail receiving device based on at least one of user preference information and information of the capabilities of the selected electronic mail receiving device stored in the profile database, wherein the controller monitors whether the respective portions of the electronic mail message have been retrieved from at least one of the corresponding electronic mail receiving devices and deletes respective portions of the electronic mail message from selected ones of the other electronic mail receiving devices if the respective portions have been retrieved.

11. The apparatus of claim 10, wherein the controller retrieves a delete list from a database and a delete command is sent to the selected ones of the electronic mail receiving devices that are flagged for deletion in the delete list.

12. The apparatus of claim 10, wherein the controller monitors by determining if a signal is received from a selected one of the electronic mail receiving devices to which portions of the electronic mail message were sent indicating that the portions of the electronic mail message have been retrieved.

13. The apparatus of claim 10, wherein the controller monitors by sending a query signal to each of the selected ones of the electronic mail receiving devices to which portions of the electronic mail message were sent and determining if a response is received from at least one of the selected ones of the electronic mail receiving devices indicating that the receiving party retrieved the portions of the electronic mail message.

14. The apparatus of claim 7, wherein the plurality of electronic mail receiving devices include at least one of a computer, a personal digital assistant, WebTV, an intelligent or computer assisted television, and a pager.

15. The apparatus of claim 7, wherein the controller identifies the selected ones of the plurality of electronic mail receiving devices by retrieving profile information from a profile database based on a central electronic mail address of the receiving party.

16. An electronic mail message sending apparatus that sends electronic mail messages to a receiving party, comprising:

a controller; and a profile database, wherein the controller receives the electronic mail message from a sending device, selects portions of the electronic mail message to send to selected ones of the plurality of electronic mail receiving devices, and sends the portions of the electronic mail message to corresponding ones of the electronic mail receiving devices, wherein the portions of the electronic mail message are selected for a selected electronic mail receiving device based on at least one of user preference information and information of the capabilities of the selected electronic mail receiving device stored in the profile database wherein the controller identifies the selected ones of the plurality of electronic mail receiving devices by retrieving profile information from a profile database based on a central electronic mail address of the receiving party and the profile information includes at least one of a field for identifying the ones of the plurality of electronic mail receiving devices that are to receive the electronic mail messages, a field for identifying the access address of the ones of the electronic mail receiving devices that are to receive the electronic mail messages, a field to identify the portions of the electronic mail message that are to be sent to the ones of the electronic mail receiving devices that are to receive the electronic mail messages, and a field to identify which of the ones of the electronic mail receiving devices that are to receive a deletion signal once the electronic mail message is retrieved by a receiving party from at least one of the plurality of electronic mail receiving devices.

17. The apparatus of claim 7, wherein the controller selects the at least one portion of the electronic mail message and sends the at least one portion of the electronic mail message to an electronic mail receiving device when a request is received from the electronic mail receiving device.

18. A method of sending an electronic mail message to a receiving party, comprising:

receiving the electronic mail message from a sending device;

selecting at least one portion of the electronic mail message to send to selected ones of a plurality of electronic mail receiving devices, wherein the at least one portion of the electronic mail message is selected for a selected electronic mail receiving device based on at least one of user preference information and capabilities of the selected electronic mail receiving device, wherein the selected at least one portion is not equal to the entire electronic mail message; and sending the at least one portion of the electronic mail message to corresponding ones of the electronic mail receiving devices.

19. The method of claim 18, wherein the at least one portion of the electronic mail message includes at least one of the name of the sending party, the name of the receiving party, the title of the electronic mail message, the distribution list of the message, date and time of sending, body of the text message and attachments.

20. The method of claim 18, wherein the plurality of electronic mail receiving devices include at least one of a computer, a personal digital assistant, WebTV, an intelligent or computer assisted television, and a pager.

21. The method of claim 18, wherein the step of selecting at least one portion of the electronic mail message further comprises retrieving profile information from a profile database based on a central electronic mail address of the receiving party.

22. The method of claim 18, wherein the selecting step and sending step are performed when a request is received from an electronic mail receiving device.

23. An electronic mail message sending apparatus that sends electronic mail messages to a receiving party, comprising:

a controller; and a profile database, wherein the controller receives the electronic mail message from a sending device, selects at least one portion of the electronic mail message to send to selected ones of the plurality of electronic mail receiving devices, and sends the at least one portion of the electronic mail message to corresponding ones of the electronic mail receiving devices, wherein the at least one portion of the electronic mail message is selected for a selected electronic mail receiving device based on at least one of user preference information and information of the capabilities of the selected electronic mail receiving device stored in the profile database, wherein the selected at least one portion is not equal to the entire electronic mail message.

24. The apparatus of claim 23, wherein the at least one portion of the electronic mail message includes at least one of the name of the sending party, the name of the receiving party, the title of the electronic mail message, the distribution list of the message, date and time of sending, body of the text message and attachments.

25. The apparatus of claim 23, wherein the plurality of electronic mail receiving devices include at least one of a computer, a personal digital assistant, WebTV, an intelligent or computer assisted television, and a pager.

26. The apparatus of claim 23, wherein the controller identifies the selected ones of the plurality of electronic mail receiving devices by retrieving profile information from a profile database based on a central electronic mail address of the receiving party.

27. The apparatus of claim 23, wherein the controller selects the at least one portion of the electronic mail message and sends the at least one portion of the electronic mail message to an electronic mail receiving device when a request is received from the electronic mail receiving device.

* * * * *